US012709275B2

(12) United States Patent
Awathe et al.

(10) Patent No.: US 12,709,275 B2
(45) Date of Patent: Aug. 18, 2026

(54) VEHICULAR SENSING SYSTEM WITH LATERAL THREAT ASSESSMENT

(71) Applicant: Magna Electronics Inc., Auburn Hills, MI (US)

(72) Inventors: Arpit Awathe, Auburn Hills, MI (US); Tejas Murlidhar Varunjikar, Troy, MI (US); Arihant Jain, Auburn Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 128 days.

(21) Appl. No.: 18/662,110

(22) Filed: May 13, 2024

(65) Prior Publication Data

US 2024/0383479 A1 Nov. 21, 2024

Related U.S. Application Data

(60) Provisional application No. 63/502,451, filed on May 16, 2023.

(51) Int. Cl.

*B60W 30/095* (2012.01)
*B60W 30/18* (2012.01)
*B60W 50/14* (2020.01)
*B60W 60/00* (2020.01)
*G06V 20/56* (2022.01)

(Continued)

(52) U.S. Cl.

CPC .. *B60W 30/18163* (2013.01); *B60W 60/0027* (2020.02); *G06V 20/588* (2022.01); *G08G 1/167* (2013.01); *H04N 25/76* (2023.01); *B60W 2554/4042* (2020.02); *B60W 2554/802* (2020.02)

(58) Field of Classification Search

CPC ....... B60W 30/18163; B60W 60/0027; B60W 2554/4042; B60W 2554/802; B60W 2050/143; B60W 30/0956; B60W 50/14; B60W 60/0015; B60W 2552/53; B60W 2554/804; G08G 1/167; G06V 20/588; H04N 25/76

USPC .......................................................... 701/23

See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |

(Continued)

*Primary Examiner* — Hossam M Abd El Latif

(74) *Attorney, Agent, or Firm* — HONIGMAN LLP

(57) ABSTRACT

A vehicular sensing system includes a camera and a radar sensor disposed at a vehicle. The system determines a plurality of data points that each represents a respective position on a respective lane marker of the road relative to the equipped vehicle. The system, for each data point of the plurality of data points, tracks the respective positions on respective lane markers relative to the equipped vehicle. The system detects presence of another vehicle rearward of the equipped vehicle, and determines location of the detected other vehicle relative to the tracked respective positions on respective lane markers that are located rearward of the equipped vehicle. The vehicular sensing system determines a collision threat for a lane change maneuver by the equipped vehicle based on the tracked respective positions. Responsive to determining that the detected object is not a collision threat, the system maneuvers the vehicle to an adjacent traffic lane.

32 Claims, 10 Drawing Sheets

(51) Int. Cl.
*G08G 1/16* (2006.01)
*H04N 25/76* (2023.01)

(56) References Cited

U.S. PATENT DOCUMENTS

| | | | |
|---|---|---|---|
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,013,780 | B2 | 9/2011 | Lynam |
| 8,027,029 | B2 | 9/2011 | Lu et al. |
| 8,155,839 | B2 | 4/2012 | Nakano et al. |
| 8,868,221 | B1 | 10/2014 | Mealy |
| 9,036,026 | B2 | 5/2015 | Dellantoni et al. |
| 9,146,898 | B2 | 9/2015 | Ihlenburg et al. |
| 9,689,967 | B1 | 6/2017 | Stark et al. |
| 9,753,121 | B1 | 9/2017 | Davis et al. |
| 9,954,955 | B2 | 4/2018 | Davis et al. |
| 10,071,687 | B2 | 9/2018 | Ihlenburg et al. |
| 10,099,614 | B2 | 10/2018 | Diessner |
| 10,424,136 | B2 | 9/2019 | Oh et al. |
| 10,841,571 | B2 | 11/2020 | Sigle |
| 10,866,306 | B2 | 12/2020 | Maher et al. |
| 10,870,400 | B2 | 12/2020 | Thomas et al. |
| 11,110,794 | B2 | 9/2021 | Yokota et al. |
| 11,403,857 | B2 | 8/2022 | Sathyanarayana et al. |
| 11,609,304 | B2 | 3/2023 | Kunkel |
| 11,620,522 | B2 | 4/2023 | Potnis |
| 11,745,749 | B2 | 9/2023 | Potnis |
| 12,043,309 | B2 | 7/2024 | Prasad Challa et al. |
| 12,110,015 | B2 | 10/2024 | Varunjikar et al. |
| 12,258,014 | B2 | 3/2025 | Varunjikar et al. |
| 2013/0261897 | A1 | 10/2013 | Potter et al. |
| 2016/0210775 | A1 | 7/2016 | Alaniz et al. |
| 2017/0306874 | A1 | 10/2017 | Wu et al. |
| 2017/0356994 | A1 | 12/2017 | Wodrich et al. |
| 2018/0328744 | A1* | 11/2018 | Miyake ................ G08G 1/0129 |
| 2018/0370527 | A1* | 12/2018 | Rachor .................. B60Q 9/008 |
| 2019/0138432 | A1 | 5/2019 | Nagaraj et al. |
| 2019/0146492 | A1 | 5/2019 | Phillips et al. |
| 2019/0276043 | A1 | 9/2019 | Uchida et al. |
| 2019/0339382 | A1 | 11/2019 | Hess et al. |
| 2019/0384294 | A1* | 12/2019 | Shashua ............. G01C 21/3476 |
| 2020/0062259 | A1 | 2/2020 | Huh |
| 2020/0132498 | A1* | 4/2020 | Matsumaru ...... G08G 1/096844 |
| 2020/0225044 | A1* | 7/2020 | Tohriyama ......... G01C 21/3848 |
| 2020/0249684 | A1 | 8/2020 | Onofrio et al. |
| 2020/0339109 | A1 | 10/2020 | Hong et al. |
| 2021/0248391 | A1* | 8/2021 | Kizumi .............. G01C 21/3863 |
| 2021/0255984 | A1 | 8/2021 | Khatri |
| 2022/0009522 | A1 | 1/2022 | Zhang et al. |
| 2022/0048566 | A1 | 2/2022 | Prasad Challa et al. |
| 2022/0097711 | A1* | 3/2022 | Liu .................. G08G 1/096741 |
| 2022/0135030 | A1 | 5/2022 | Varunjikar et al. |
| 2022/0176960 | A1 | 6/2022 | Awathe et al. |
| 2022/0180750 | A1* | 6/2022 | Chen ...................... G08G 1/166 |
| 2023/0008230 | A1 | 1/2023 | Cordeiro et al. |
| 2023/0146552 | A1* | 5/2023 | Itsui ...................... B60W 40/04 701/41 |
| 2023/0202471 | A1* | 6/2023 | Yu ..................... B60W 30/0956 701/26 |
| 2023/0270515 | A1 | 8/2023 | Tanabe et al. |
| 2023/0415734 | A1 | 12/2023 | Zhu et al. |
| 2024/0253622 | A1 | 8/2024 | Awathe et al. |

* cited by examiner

VEHICULAR SENSING SYSTEM WITH LATERAL THREAT ASSESSMENT

CROSS REFERENCE TO RELATED APPLICATION

The present application claims the filing benefits of U.S. provisional application Ser. No. 63/502,451, filed May 16, 2023, which is hereby incorporated herein by reference in its entirety.

FIELD OF THE INVENTION

The present invention relates generally to a vehicle sensing system for a vehicle and, more particularly, to a vehicle sensing system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular sensing system includes a camera disposed at a vehicle equipped with the vehicular sensing system. The camera views exterior and at least forward of the equipped vehicle. The camera is operable to capture image data. The camera includes a CMOS imaging array with at least one million photosensors arranged in rows and columns. A radar sensor is disposed at the equipped vehicle that senses exterior and at least rearward of the equipped vehicle. The radar sensor is operable to capture radar data. The system includes an electronic control unit (ECU) with electronic circuitry and associated software. Image data captured by the camera is transferred to the ECU, and radar data captured by the radar sensor is transferred to the ECU. The electronic circuitry of the ECU includes at least one data processor that is operable to (i) process image data captured by the camera and transferred to the ECU and (ii) process radar data captured by the radar sensor and transferred to the ECU. A road along which the vehicle is traveling includes at least two traffic lanes, each demarcated with respective lane markers. The vehicular sensing system, responsive to processing at the ECU of image data captured by the camera, and as the equipped vehicle travels along a traffic lane of the road, determines a plurality of data points, and wherein each data point of the plurality of data points represents a respective position on a respective lane marker of the road relative to the equipped vehicle. The vehicular sensing system, as the equipped vehicle travels along the traffic lane of the road, tracks the respective positions on respective lane markers relative to the equipped vehicle. The vehicular sensing system, responsive to processing at the ECU of radar data captured by the radar sensor, detects presence of another vehicle rearward of the equipped vehicle. The vehicular sensing system, responsive to detecting presence of the other vehicle rearward of the equipped vehicle, determines location of the detected other vehicle relative to the tracked respective positions on respective lane markers that are located rearward of the equipped vehicle. The vehicular sensing system determines a collision threat for a lane change maneuver by the equipped vehicle based on the determined position of the detected other vehicle relative to the tracked respective positions on the respective lane markers that are located rearward of the equipped vehicle. Responsive to determining that the detected other vehicle is not a collision threat for the lane change maneuver, the equipped vehicle is maneuvered into an adjacent traffic lane.

These and other objects, advantages, purposes and features of the present invention will become apparent upon review of the following specification in conjunction with the drawings.

DESCRIPTION OF THE PREFERRED EMBODIMENTS

Advanced Driver Assistance Systems (ADAS) aid the driver by increasing safety and driving comfort. These systems obtain information about the surrounding environment through different sensors, such as one or more cameras, one or more radar sensors, etc. This information is then used to develop several assist features. Implementations herein include a system that disables lateral control of a vehicle equipped with sensors (such as camera(s), radar sensor(s), lidar sensor(s), ultrasonic sensor(s), etc.) to obtain information about objects within the vehicle surroundings, and, after assessing any possible impending collision with the equipped vehicle, alerts the driver with visual and/or acoustic and/or haptic warnings. For example, the system limits lateral control of a lane change ADAS feature which generally assists the driver in changing lanes. The system may alert or instruct the driver to take over control of steering and avoid any possible collision when the lane change feature is actively assisting the driver to change the lane. Alternatively, the system may not allow the lane change assist feature to activate in assisting the lane change, thus increasing safety.

A vehicle sensing system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The sensing system includes an image processor or image processing system that is operable to receive image data from one or more cameras and provide an output to a display device for displaying images representative of the captured image data.

Optionally, the sensing system may provide a display, such as a rearview display or a top down or bird's eye or surround view display or the like.

Figure 1:
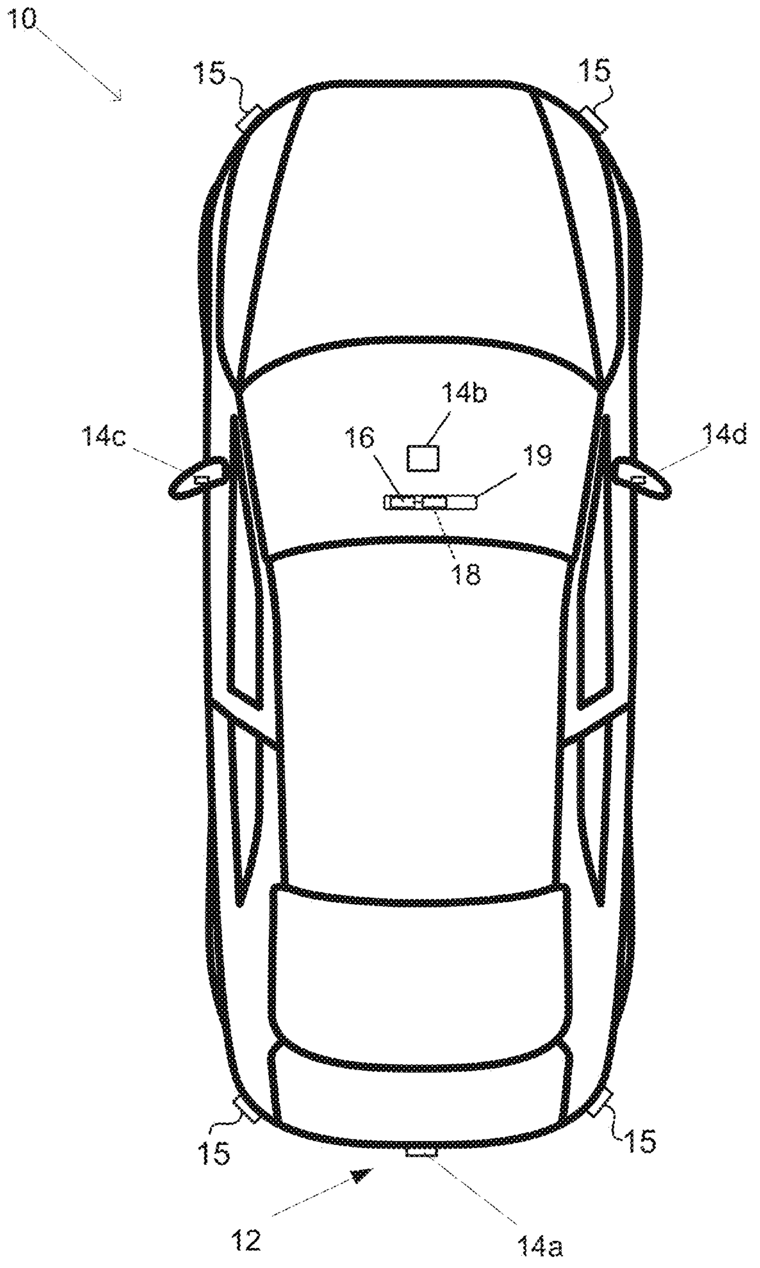
FIG. 1 is a plan view of a vehicle with a sensing system that incorporates cameras and radar sensors.

Referring now to the drawings and the illustrative embodiments depicted therein, a vehicle 10 includes an imaging system or sensing system 12 that includes at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (e.g., disposed at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, the forward viewing camera 14*b* may be disposed at the windshield of the vehicle and view through the windshield and forward of the vehicle, such as for a machine sensing system (such as for traffic sign recognition, headlamp control, pedestrian detection, collision avoidance, lane marker detection and/or the like). The sensing system may include one or more radar sensors 15 (e.g., corner radar sensors). The sensing system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
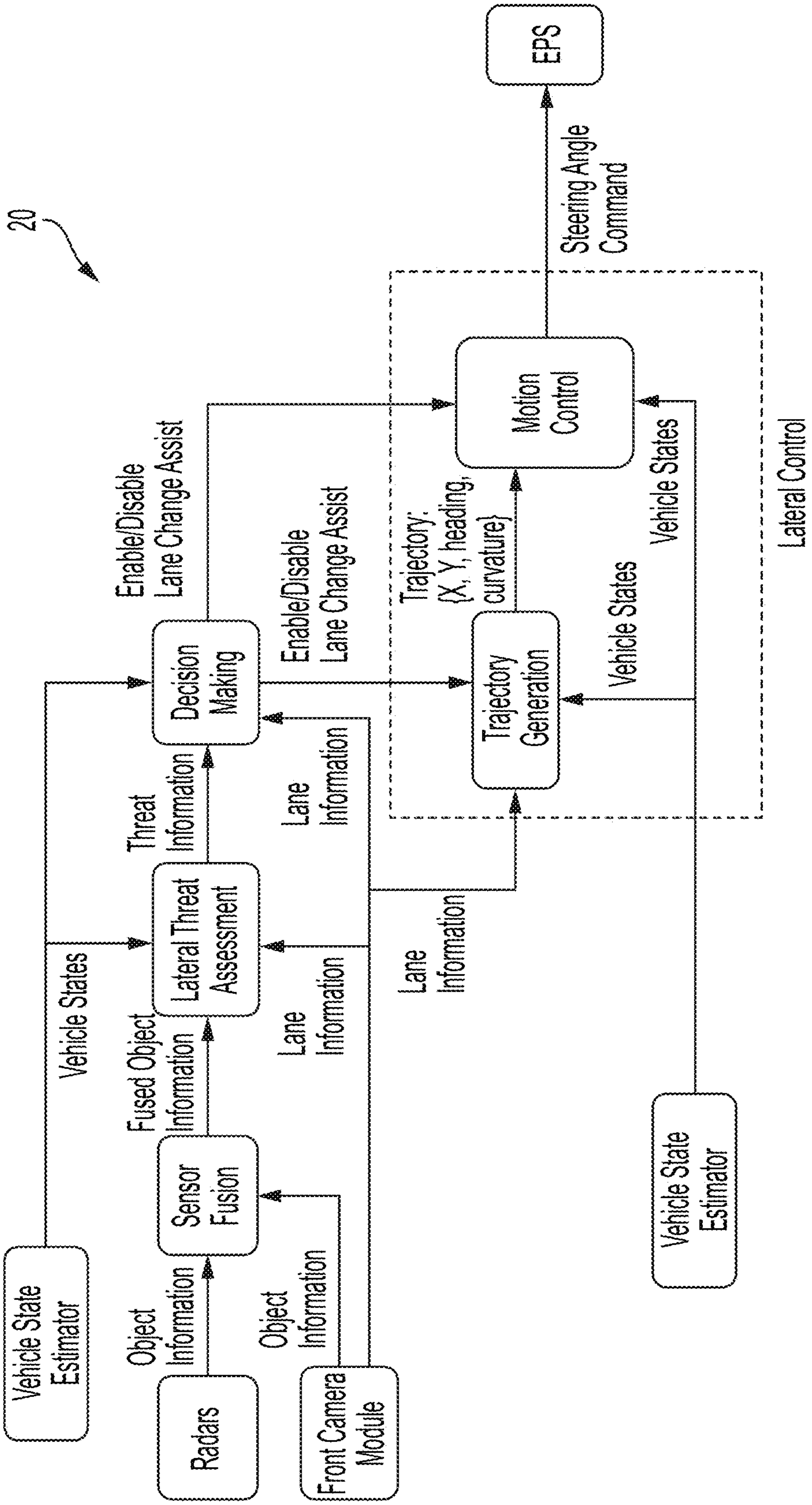
FIG. 2 is a block diagram of the sensing system of FIG. 1.

FIG. 2 includes a block diagram 20 of a lateral threat assessment system for a vehicular sensing system. The system includes a front camera module (FCM) that includes camera hardware and software that generates raw lane information and front object information (e.g., lane coefficients, quality, object relative position, velocity, acceleration, object type, etc.). The system may also include one or more radar sensors with hardware and software that generate raw object information such as object relative position, velocity, acceleration, object type, etc. The system includes a sensor fusion module that uses the object information from various sensors (e.g., the FCM and/or radar sensors) and combines or fuses the information to calculate an accurate position of the object relative to the vehicle along with various object parameters such as pose, velocity, acceleration, etc. The sensor fusion module is optional and may work with only one or more cameras or only one or more radar sensors.

The system includes a vehicle state estimator module that estimates the state(s) of the equipped vehicle (e.g., the vehicle speed, yaw rate, etc.) using the current state of the equipped vehicle (i.e., the ego vehicle) and external disturbances such as road gradient. A lateral threat assessment module identifies any threat present before a lane change maneuver is started by the lane change assist feature (e.g., other vehicles, bicycles, pedestrians, road debris, etc.). This module may use information from the other modules, such as the vehicle state estimator module, the front camera module, and/or the sensor fusion module, to determine whether there are any collision threats around the vehicle. A decision making module uses the vehicle states, raw lane information, processed lane information, and/or sensor fusion data to determine whether to enable or disable the lane change feature (i.e., whether to allow an automatic or assisted lane change maneuver to occur). A trajectory generation module determines a path or trajectory for the equipped vehicle to follow depending on instructions from the decision making module.

A motion control module uses the vehicle trajectory (generated by the trajectory generation module) and the current vehicle states to generate a steering command for the vehicle to follow along the generated trajectory. The system may determine a steering angle, a steering wheel angle, a curvature, etc. An Electric Power Steering (EPS) module applies steering torque commands to enable the ADAS feature for lateral control. The module receives the steering angle command from the Motion Control module.

Figure 3:
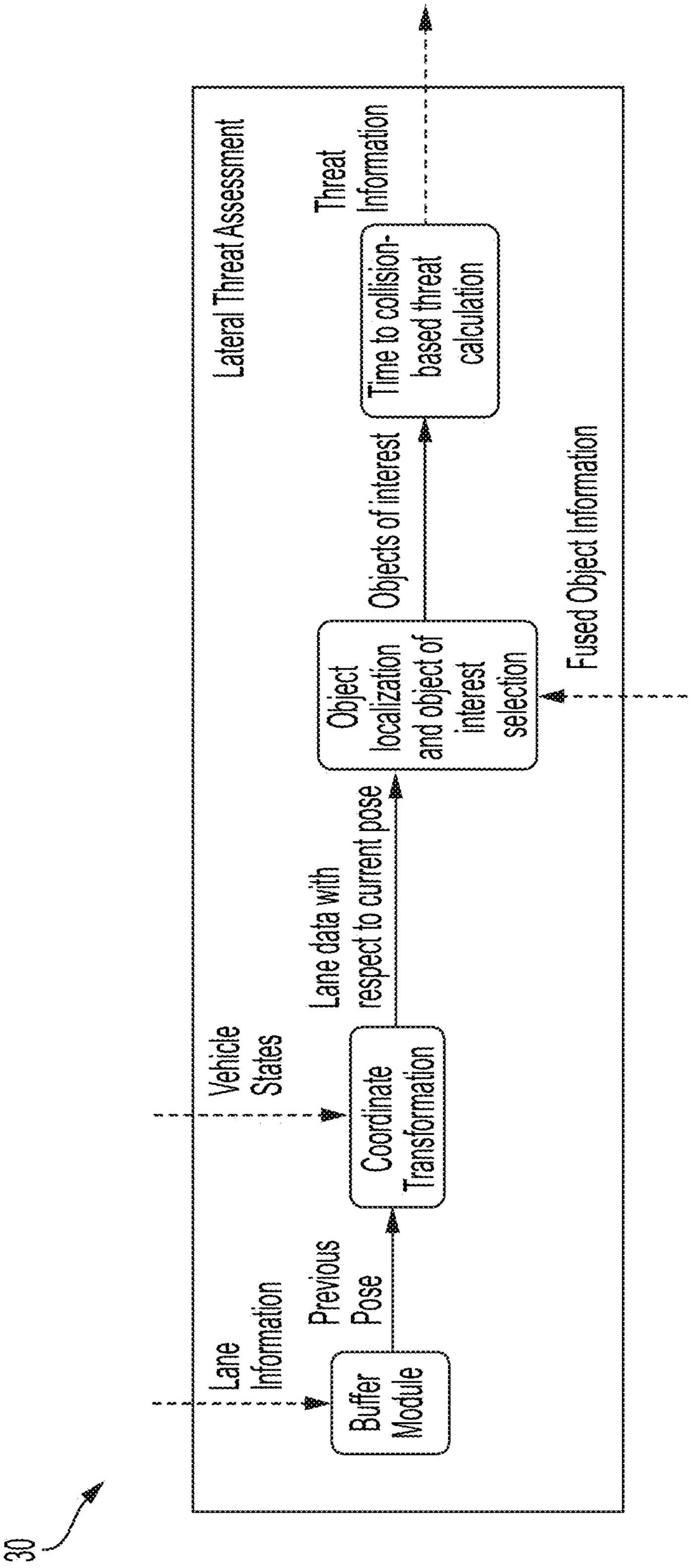
FIG. 3 is a block diagram of a lateral threat assessment module.

FIG. 3 includes a block diagram 30 that illustrates a more detailed view of the lateral threat assessment module. In this example, the module includes a buffer submodule that receives lane information and provides a previous pose (i.e., of the equipped vehicle) to a coordinate transformation submodule. The coordinate transformation submodule, using the previous pose and the current vehicle state, determines a current pose and generates lane data with respect to the current pose. An object localization and object of interest selection submodule uses the lane data and fused object information to generate objects of interest. A time to collision-based threat calculation submodule generates threat information using the objects of interest.

As used herein, pose refers to the collective information of the position and orientation of an object (i.e., x, y, and θ) such as the equipped vehicle or other vehicles in the equipped vehicle's vicinity. A threat refers to any vehicle (e.g., a vehicle at least partially behind and partially to the side of the equipped vehicle) that must decelerate at a rate greater than a threshold rate (e.g., greater than or equal to 1 $m/s^2$ or greater than 3 $m/s^2$, etc.) to avoid a collision and/or adjust for a lane change by the equipped vehicle. An object refers to any moving or non-moving vehicle.

The lane change assistance feature is a driver-initiated feature capable of automatically changing lanes for the driver (i.e., move the equipped vehicle from a current lane to an adjacent lane to the right or left of the current lane). However, to ensure a safe lane change, the system must continuously monitor the surroundings of the vehicle to avoid any possible collision (e.g., with another vehicle traveling in an adjacent lane). The system should not activate even after initiation by the driver if there is a possible collision during lane change. If the lane change is active and suddenly a surrounding object (e.g., another vehicle) poses a collision threat then the system should terminate or delay the lane change maneuver by stopping or delaying the steering command and requesting the driver to take over the steering control.

The lateral threat assessment or LTA module is used to continuously monitor the threats from the lane change path (i.e., objects that pose a collision risk with the vehicle during the lane change maneuver). The module may receive the input from the sensors (e.g., cameras, radar sensors, etc.) and uses sensor information such as object information, lane information, and equipped vehicle state to identify any critical threats in the lane change path. The lateral threat assessment module locates objects in the surrounding lanes and then determines or calculates which of these objects possess a collision threat. The module may determine a threat level or classification based on a likelihood of collision. The lanes present in the front of the equipped vehicle can be identified using the front camera module (FCM) to easily locate an object in front of the vehicle. However, due to the greater expense and complexity of installing a rear camera module, it is challenging to get lane information to the rear of the equipped vehicle (and standard rear backup cameras may lack the field of view and/or processing necessary to obtain the lane information). This increases the difficulty of evaluating objects to the rear of the vehicle, which affects threat assessment.

Figure 4B:
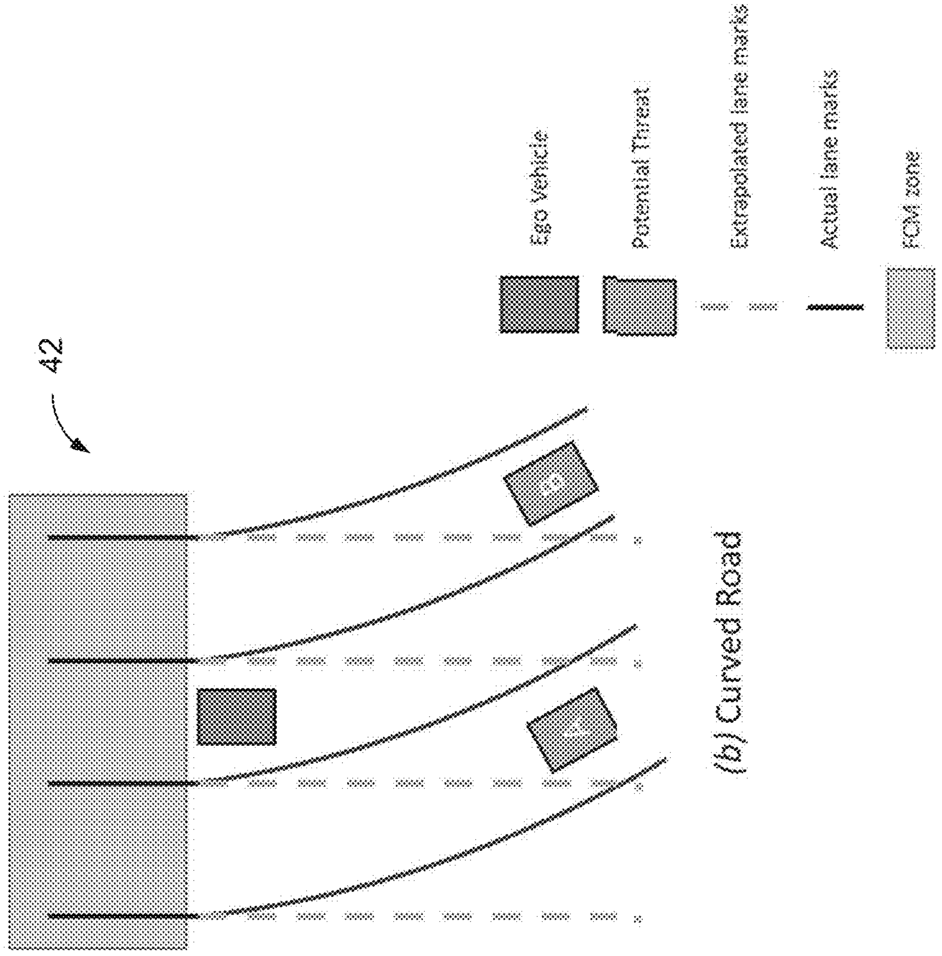
FIGS. 4A and 4B are schematic views of extrapolation of lane marker data points.
Figure 4A:
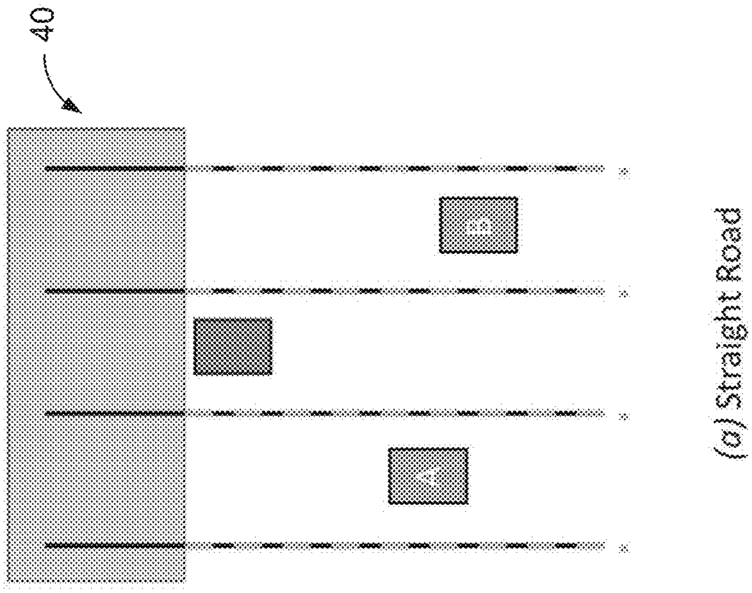

Due to the general lack of rear camera modules to identify the lanes to the rear of the equipped vehicle, the lateral threat assessment module may use an alternative means to locate a rear object (i.e., an object at least partially behind the equipped vehicle) in the surrounding lanes. For example, the module may directly extrapolate the lane marking observed by the front camera module. Once the lanes have been extrapolated to the rear of the vehicle, the object data from the radar through sensor fusion can be used to locate the object in a specific lane. This method of lane assignment can work in certain scenarios where the lanes are straight or on a constant curvature road. As shown in FIG. 4A, a straight road includes an area 40 that is observed by the front camera module. The solid lines illustrate the actual lane marks observed by the front camera module, whereas the dashed lines illustrate the extrapolated lane marks based on the lane marks observed by the front camera module. Since the lane and lane marks are straight, the extrapolated lane marks are also straight. In this example, the vehicles A and B (i.e., potential threats) are perceived to be in left and right lanes based on the extrapolated lane marks, respectively.

However, there are conditions where this method may fail. For example, the failure could be due to incorrectly locating the object in a lane and thus giving false positives to limit the functionality or giving a false negative which could be a safety hazard (i.e., where the module does not consider a critical object as a threat). These scenarios can arise when there is a start of a curved road or at the end of a curvy road segment. It can also arise on a road with varying curvature. As shown in FIG. 4B, a curved road includes an area 42 that is observed by the front camera module. The equipped vehicle is at a point where the curved portion ends. In this example, the lanes observed by the front camera module are straight. Therefore, when the rear lane extrapolation is done, the extrapolation is also straight, which is incorrect, as the lanes are actually curved. Therefore, while the potential collision threats (i.e., vehicle A and vehicle B) are actually present on the left and right lanes, the threats A and B are observed to be in the host and next right lane due to incorrect extrapolation (by not accounting for lane curvature). The adjacent lanes are observed to be vacant even though there are potential threats present. This is an example where this method could fail and could cause serious safety issues.

Implementations herein include storing lane data from the front camera module and transforming the coordinates as the vehicle moves and use the transformed coordinates to obtain lane information behind the equipped vehicle (i.e., to the rear of the equipped vehicle). The system includes a down-sampling logic aspect, a buffer module and coordinate transform aspect, and a lane data point filling for the buffer module aspect. Each aspect is explained in more detail below.

Figure 5:
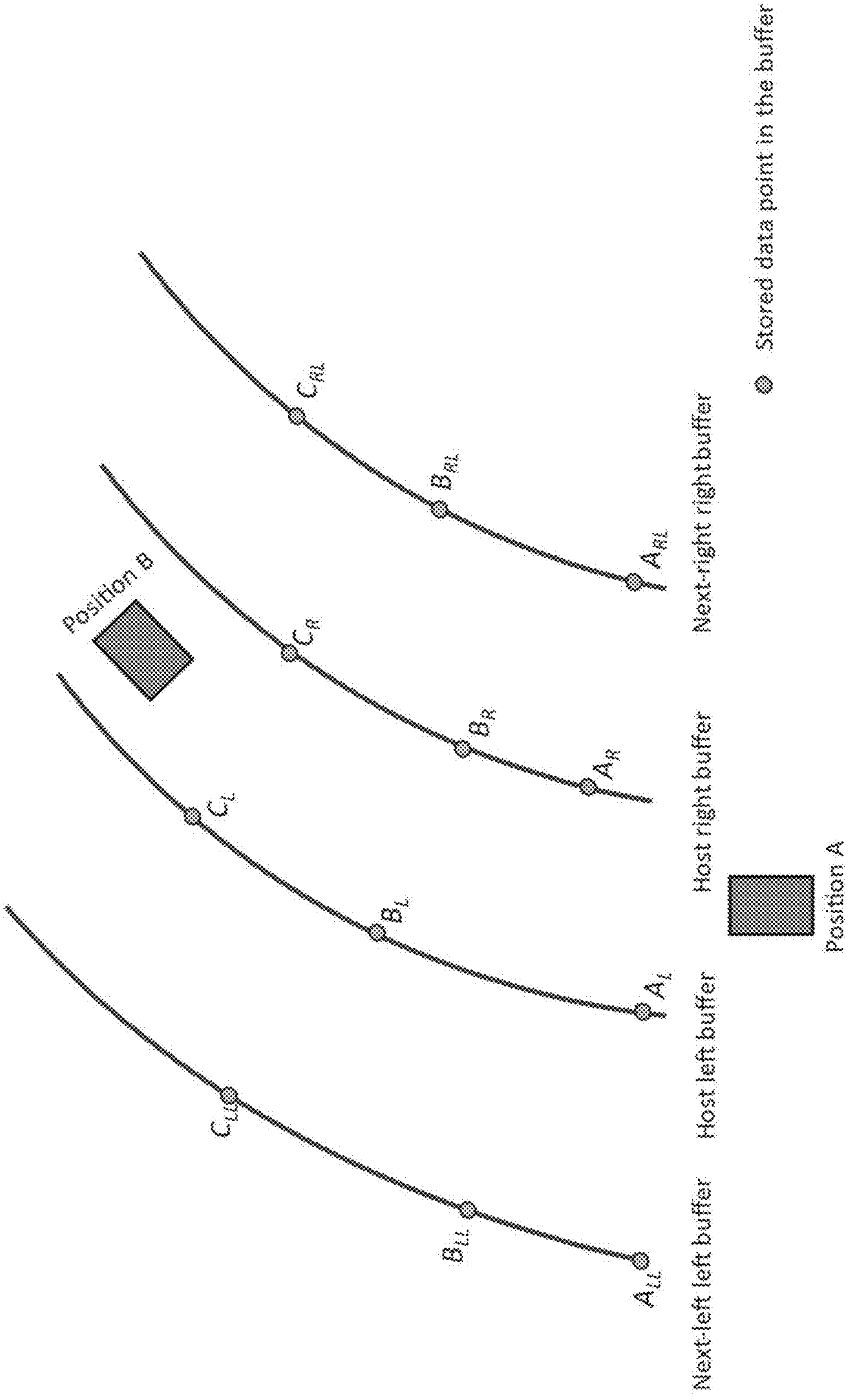
FIG. 5 is a schematic view of coordinate transformation of lane marker data points.

For the down sampling logic aspect, the front lane data obtained by the front camera module may be stored and transformed as the vehicle moves. The system creates buffer data and stores 'M' number (i.e., any appropriate number) of data points of the lane marks which includes the front and rear data points on the lane marks. The number of 'M' data points may be based on a size of a buffer available to store the data points, based on current conditions of the vehicle (e.g., speed), etc. The number may be static (i.e., unchanging) or dynamic based on current conditions. These 'M' data points are selected/down-sampled based on the criteria that they all are separated by an equal threshold distance (i.e., a minimum threshold distance to ensure sufficient distance/spacing based on buffer size and/or vehicle speed) and that the lane mark detection is sufficient (e.g., based on confidence, probability, etc.). In the example of FIG. 5, from Position A to Position B, there are three selected points for each lane mark/boundary. When the front camera module cannot detect the lane marks such that lane mark detection is insufficient (i.e., based on one or more confidence or likelihood thresholds), then the point is selected as soon as the lane mark detection becomes sufficient after the minimum threshold distance.

Figure 6:
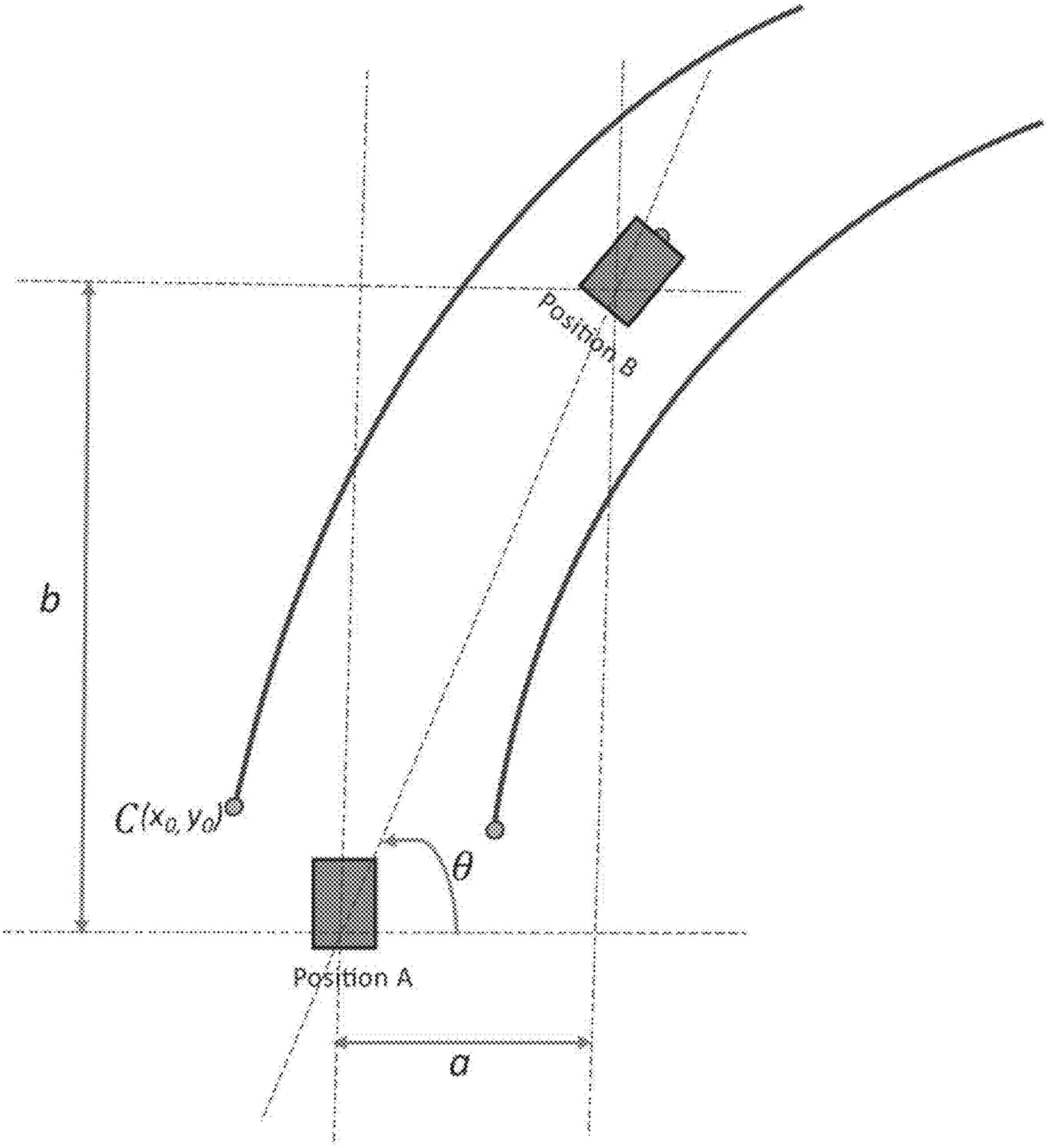
FIG. 6 is a schematic view of collection of lane marker data points behind a vehicle.

For the buffer module and coordinate transformation aspect, the lane data point information is entered in the buffer with respect to the current location of the equipped vehicle. As the vehicle moves forward along the traffic lane, all the previously entered data points stored in the buffer must be transformed so that at any given instance of time the information of lane data points stored in the buffer is accurate or updated with respect to the current position of the equipped vehicle. In the example of FIG. 6, the equipped vehicle is at Position A when lane data point C ($x_0$, $y_0$) is being entered in the buffer. As the vehicle moves ahead and reaches Position B, the information of Point C with respect to the current position of the vehicle at Point B is ($x_{10}$, $y_{10}$). Optionally, this may be obtained using transformation equation below:

$$X_{10} = (Y_0 - a)\sin(\theta) + (X_0 - b)\cos(\theta)$$

$$Y_{10} = (Y_0 - a)\cos(\theta) - (X_0 - b)\sin(\theta)$$

Here, a represents the lateral distance between Position A and Position B, b represents the longitudinal distance between Position A and Position B, and θ represents the change in angle (i.e., orientation) of the vehicle from Position A to Position B. The system may track these changes using any number of sensors, such as based on image data captured by the front camera module, accelerometers, inertial measurement units (IMUs), etc.

Figure 7:
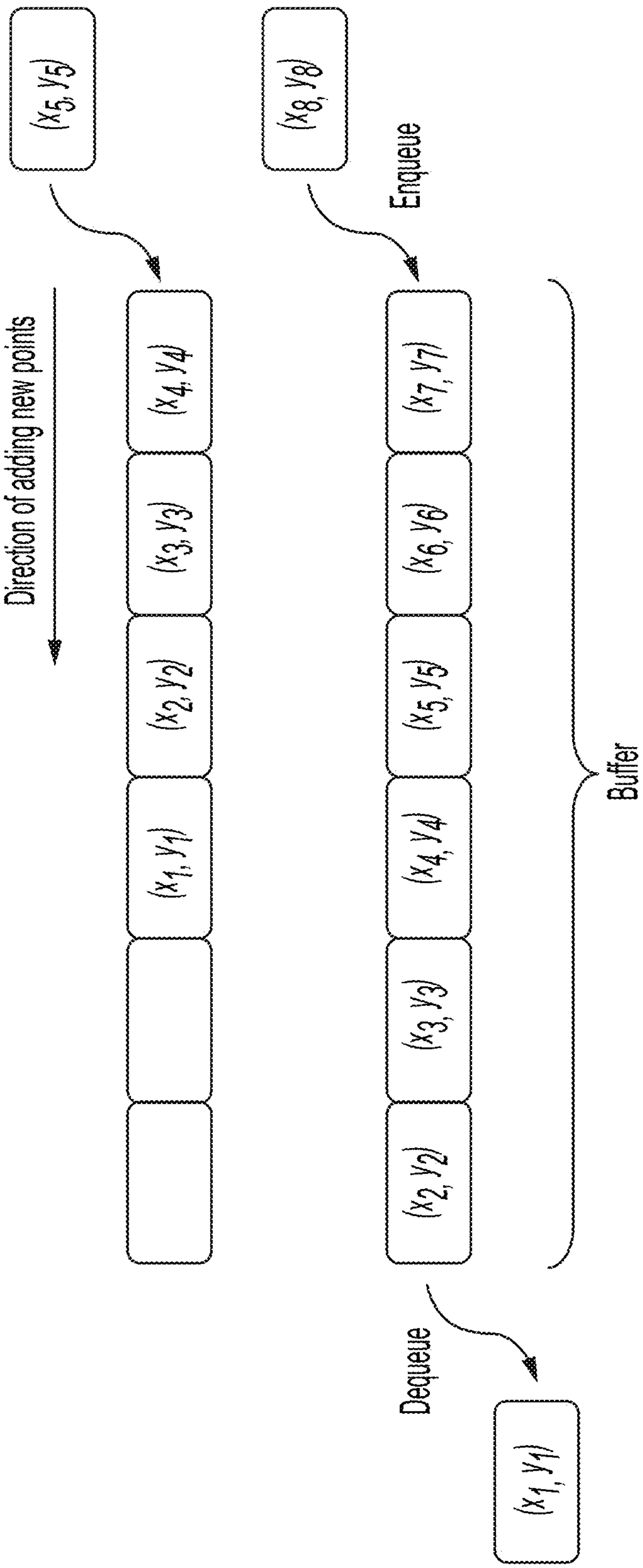
FIG. 7 is a schematic view of a buffer module.

With respect to the lane data point filling aspect, when the system is activated or enabled, the buffer module may begin collecting the data points. Initially, when the buffer is not yet fully filled, the system may continue to collect the points at a specific gap and/or frequency and/or distance. As discussed above, a minimum threshold distance may be used to determine the frequency at which data points are collected. For example, the data points may only be collected when the minimum threshold distance is met (e.g., the vehicle has traveled at least the minimum threshold distance). There may be instances where lane marks are not present (i.e., the lane does not have lane marks or the camera cannot detect lane marks) when the threshold is met. In these instances, the data point is collected as soon as a valid lane mark is present after the threshold is met. As shown in FIG. 7, once the buffer module is filled, it starts replacing the oldest point (i.e., the buffer module keeps the latest point in the memory by dropping the oldest collected points). For example, the buffer module is a circular buffer. Thus, as the vehicle moves and once the buffer is filled, the buffer module will always have the latest lane marks data for the rear of the vehicle till some range (depending on the size of the buffer, the frequency of data points, etc.). Until the buffer module is filled, the lateral threat assessment module may prevent any lane change maneuver because of a lack of rear lane information.

Figure 8:
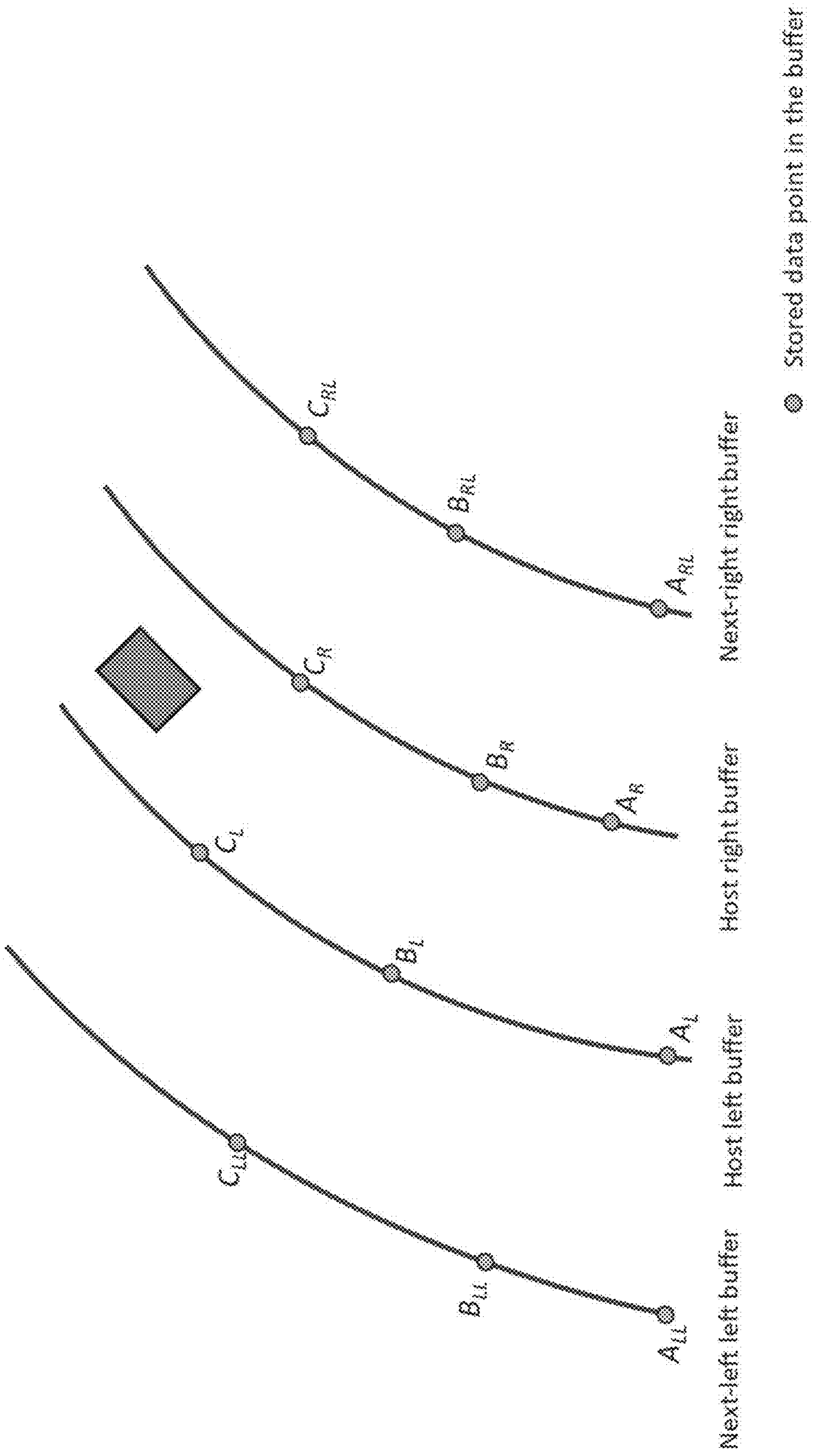
FIG. 8 is a schematic view of a buffer transition during a lane change maneuver.

Optionally, there are four relevant lane marks for the lateral threat assessment module. For example, there is the next-left left lane-mark (i.e., for the traffic lane to the left and adjacent to the current lane the vehicle is traveling along), the host left lane-mark, the host right lane-mark, and the next-right right lane mark (i.e., for the traffic lane to the right and adjacent to the current lane the vehicle is traveling along). As shown in FIG. 8, each lane may be associated with a respective and independent buffer that collects and stores data points for that specific lane. For example, the system maintains four independent buffers for the four lane marks.

The crossing of the lane boundary during the lane change (i.e., the point when the vehicle transitions from a first traffic lane to a second traffic lane during a lane change maneuver) may be detected by the system after, for example, determining a change in the lane-offset is greater than a certain threshold value. In this case, at least a portion of the buffer modules may be reused rather than discarding all the collected points. This improves the computational performance of the lateral threat assessment module. For example, when the equipped vehicle changes lane to the left (i.e., moves from the current lane to the left adjacent lane), then the following transitions in the lanes happen: (i) the left lane left lane-mark becomes host lane left lane-mark, (ii), the left lane right lane-mark becomes host lane right lane-mark, and (iii) the host lane right lane-mark becomes right lane right lane-mark. Because the buffer of these lanes are already filled before the lane change, the following transitions in the buffers happen: (i) the left lane left buffer becomes host lane left buffer, (ii) the left lane right buffer becomes host lane right buffer, and (iii) the host lane right buffer becomes right lane right buffer. In this way, the system may "reuse" some of the buffer data after the vehicle changes lanes instead of flushing all of the buffers and having to wait for them to refill with fresh data.

In this example, the only buffer that resets is the left lane left buffer (as this buffer now tracks a lane boundary that previously was not tracked). In this way, to continue the previous example, when another lane change back to the right lane is requested (i.e., the vehicle is to move to the right back to the original lane) and there is no threat present, the lane change may be performed instantly rather than waiting for the buffer to get filled again. This improves the functionality of the lane change assist feature. These similar transitions in the buffer happen when the vehicle performs a lane change in either direction.

Figure 9:
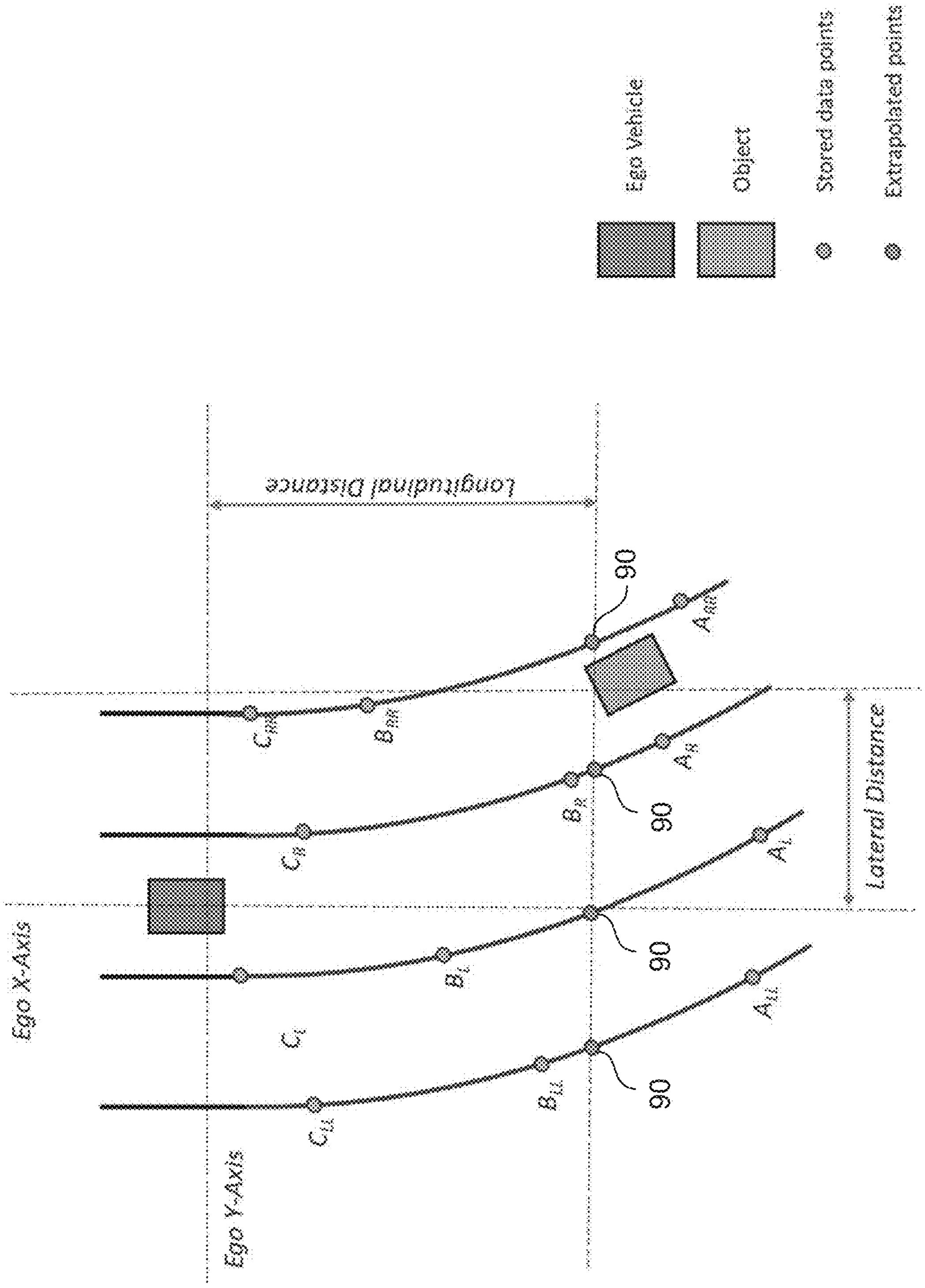
FIG. 9 is a schematic view of object localization.

When an object is detected by the sensors at the rear of the vehicle (e.g., by one or more radar sensors, ultrasonic sensors, etc.), the longitudinal and lateral distances of the object from the equipped vehicle is known (i.e., based on processing the sensor data). These distances, along with the lane data points stored in the buffer(s), are used to correctly determine which lane the detected object is in relative to the equipped vehicle. In the example of FIG. 9, the longitudinal distance of the object is used to locate the object between two indices (i.e., data points) stored in the buffer. The longitudinal distance of the object is between (i) $A_{LL}$ and $B_{LL}$ for the next-left left lane-mark, (ii) $A_L$ and $B_L$ for the host left lane-mark, (iii) $A_R$ and $B_R$ for the host right lane-mark, and (iv) $A_{RL}$ and $B_{RL}$ for the next-right right lane mark.

These data points may be linearly interpolated to determine the corresponding extrapolated points 90 on the lanes shown as shown in FIG. 9. Once these extrapolated points 90 are identified, the y-coordinate of these points may be compared with the lateral distance of the object. When the lateral distance falls between the y-coordinates of the corresponding points on the host right lane-mark and the right lane right lane-mark, then the object may be determined to be in the right lane relative to the equipped vehicle. Similarly, when the lateral distance falls between the y-coordinates of the corresponding points on the host left lane-mark and the left lane left lane-mark, then the object may be determined to be in the left lane relative to the equipped vehicle. Because the points are linearly interpolated, the accuracy is improved when the points are stored at a more frequent interval. However, this incurs additional memory and computational resources, and thus this tradeoff may be adjusted based on resources available, vehicle speed, traffic congestion, and/or other factors.

When there are scenarios where the lane marks are not present or valid (i.e., the front camera module cannot detect the lane marks with sufficient confidence and/or frequency), the data points collected may be farther apart. In these scenarios, an upper threshold may be set for the distance between two collected data points. When the two data points are collected at a distance greater than the maximum threshold distance (i.e., the distance between the two collected data points exceeds the maximum threshold distance), then the data points collected in the next lane mark may be used to calculate the data point. In FIG. 9, the distance between the data points $A_{RR}$ and $B_{RR}$ in the right lane exceeds the maximum threshold distance. That is, in this example, when the distance between these two points is greater than the upper threshold, then the corresponding point in the adjacent lane mark is used to evaluate the data point. More specifically, the point $B_R$ on the host right lane mark is projected to the right lane right lane mark. This projection can be done using, for example, a fixed default lane width. Alternatively, it can be determined using the previously collected points on the two adjacent lane-marks. This may only be valid when the distance between the collected points of at least one of the lane marks of a lane is less than the upper threshold. If the distance between the collected points on both lane marks of a lane is greater than the upper threshold, then the lateral threat assessment module may not allow the lane change assist feature to change lanes.

Figure 10:
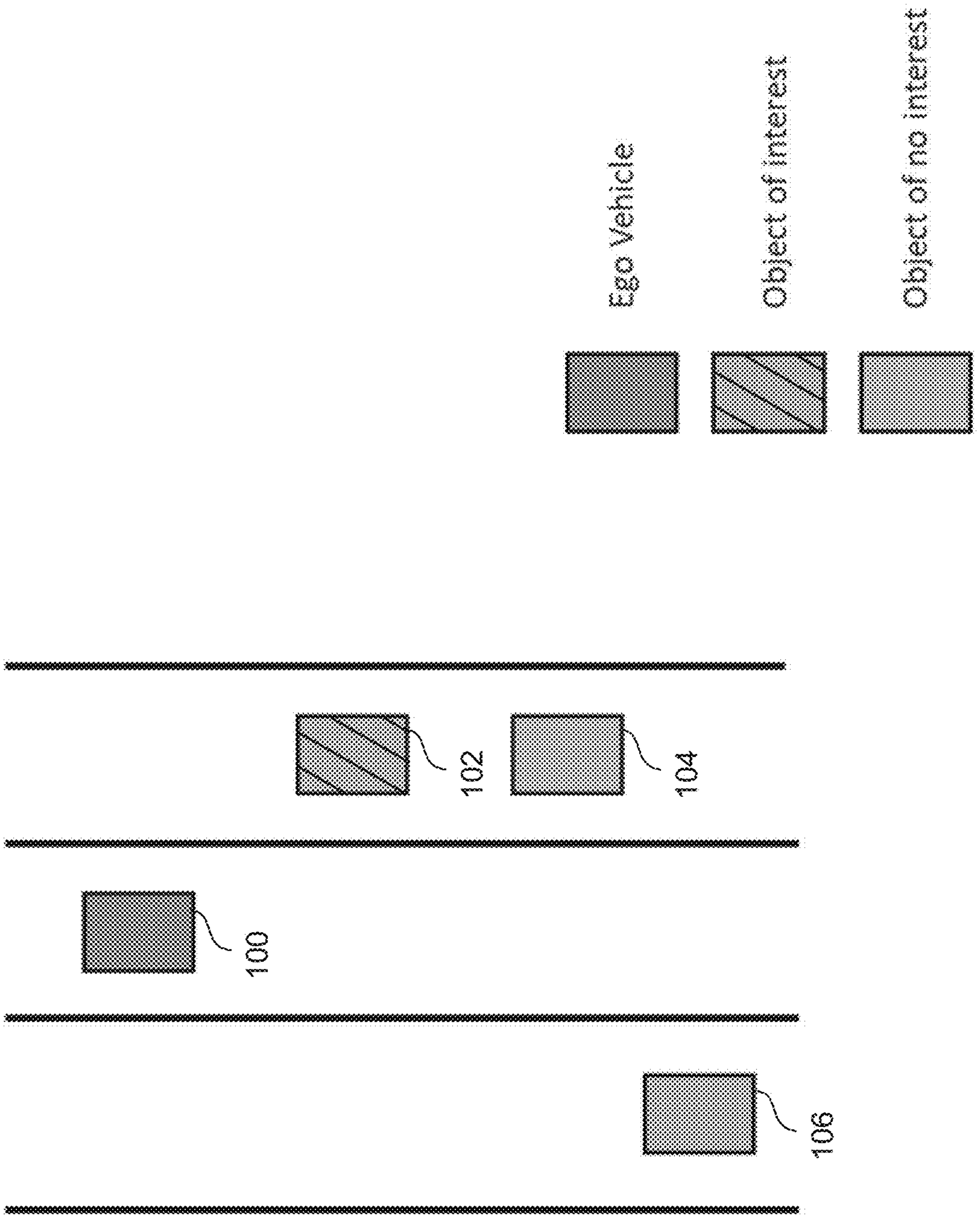
FIG. 10 is a schematic view of object of interest selection.

Once the information of the lane behind the vehicle is obtained, the system locates the objects in the correct lanes. The object data from the radar through the sensor fusion is used to identify any vehicle in the rear (i.e., at least partially behind the vehicle and not in the field of view of the front camera module). For the objects behind and/or to the side of the vehicle, the longitudinal distance with respect to the equipped vehicle should be negative. There may be various objects in the rear whose lateral distance with respect to the object is in the adjacent lane. However, only the closest vehicle in each of the adjacent lanes would be the object of interest because the closest object is the most imminent threat. FIG. 10 illustrates an example of two vehicles 102, 104 present in the rear right lane relative to the equipped vehicle 100. However, the closest vehicle 102 is considered as a potential threat while the farther vehicle 104 is not considered a threat or is considered less of a threat than the vehicle 102. Similarly, the vehicle 106 may not be considered a threat due to the distance between the vehicle 106 and the equipped vehicle 100.

Once the rear objects of interest are identified in both the adjacent lanes (i.e., the lane to the left of the current lane and the lane to the right of the current lane), a minimum safe distance is determined for each of these objects. The minimum safe distance may be determined based on the relative velocity of the detected objects relative to the equipped vehicle. For example, a situation may be deemed critical when the rear oncoming vehicle must decelerate at a rate of greater than, for example, 3 $m/s^2$. This is just an example, and the rate threshold may be any amount (e.g., greater than 2 $m/s^2$, greater than 4 $m/s^2$, etc.). The rate threshold may be adaptable or adjustable based on environmental conditions (such as wet/icy roads, visibility, and/or temperature), vehicle speed, etc. Therefore, to determine the minimum safe distance, the following terms may be considered.

First, the distance traveled by the rear oncoming vehicle due to the delay in braking may be considered. That is, when the equipped vehicle is changing lanes, the driver of the rear vehicle will have a delay in braking to respond to the lane change maneuver of the equipped vehicle, and the distance of this delay (e.g., determined based on average human response time, environmental conditions, current speed of the other vehicle relative to the equipped vehicle, etc.) is considered. Second, the distance traveled by the rear oncoming vehicle during braking is considered. That is, there is an amount of distance traveled by the rear oncoming vehicle even when the vehicle is decelerating at the threshold limit (e.g., the max braking or deceleration limit, such as 3 $m/s^2$). Third, the distance traveled by the equipped vehicle in a threshold period of time (e.g., one second, two seconds, etc.) is considered. This is a factor of safety used to ensure that the distance between the rear oncoming vehicle and the equipped vehicle is always more than the distance the equipped vehicle can travel in the threshold period of time (i.e., to avoid the vehicles coming too close to each other). The sum of these distances is determined, which provides the minimum safe distance between the rear oncoming vehicle and the equipped vehicle that is changing lanes. This distance is continuously determined and updated whenever there is any object identified in the adjacent lanes (i.e., any object that may be determined to be a potential collision threat).

The longitudinal object distance determined from the sensor fusion may be used to further determine whether an object is a critical threat. When the longitudinal distance of the object is less than the minimum safe distance determined with the above technique, then that object may be marked as a threat for the lane change assist feature. When the threat is present in the same lane as the target lane for the lane change (i.e., an adjacent lane to the equipped vehicle), the lateral threat assessment module may raise a flag that will suppress the steering angle command from the lane change assist feature, and/or the module will alert the driver to the threat present in the target lane.

The system may provide any number of alerts to the driver. For example, the system may generate a visual alert, an acoustic alert, and/or a haptic alert. When there is a threat present in the adjacent lane and the driver is not actively changing lanes, the object may be marked as red on a display screen disposed within the vehicle. When there is a threat present in the adjacent lane and the driver is actively changing lanes using the lane change assist feature, the system may provide warning text displayed on the display screen. The system may additionally or alternatively provide an acoustic warning and/or the lane change assist feature will be suppressed by canceling the steering angle command.

Thus, implementations herein include an ADAS feature that determines whether lanes adjacent to an equipped vehicle are available for a lane change. The system assists the driver in performing the lane change using steering assistance. The system may disable the lane change maneuver when a collision threat is detected. The system may alert the driver through visual and/or acoustic warnings. Optionally, the system prohibits the lane change maneuver from beginning in case of a collision threat, even if the driver attempts to initiate the lane change feature. Optionally, the system determines whether a lane boundary has been crossed during the lane change maneuver. The system may determine adjacent lane availability using a lateral threat assessment module. The lateral threat assessment module may include down-sampling logic that determines the pose information to include within a buffer module that stores the pose information of lane data points received from the down-sampling logic. The module may also include a coordinate transformation module to continuously update the pose information of lane data points to have the lane data points in reference to the equipped vehicle's current location. The module may include logic to locate vehicles to the rear of the equipped vehicle in their respective correct lanes and to identify objects of interest in the rear for threat assessment even when one of the lane marks is missing for some time. The system may perform critical object selection based on the relative velocities of the object.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the sensing system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:

a camera disposed at a vehicle equipped with the vehicular sensing system, the camera viewing exterior and at least forward of the equipped vehicle;

wherein the camera is operable to capture image data;

wherein the camera comprises a CMOS imaging array, and wherein the CMOS imaging array comprises at least one million photosensors arranged in rows and columns;

a radar sensor disposed at the equipped vehicle, the radar sensor sensing exterior and at least rearward of the equipped vehicle;

wherein the radar sensor is operable to capture radar data;

an electronic control unit (ECU) comprising electronic circuitry and associated software;

wherein image data captured by the camera is transferred to the ECU, and wherein radar data captured by the radar sensor is transferred to the ECU;

wherein the electronic circuitry of the ECU comprises at least one data processor that is operable to (i) process image data captured by the camera and transferred to the ECU and (ii) process radar data captured by the radar sensor and transferred to the ECU;

wherein a road along which the vehicle is traveling comprises at least two traffic lanes, each demarcated with respective lane markers;

wherein the vehicular sensing system, responsive to processing at the ECU of image data captured by the camera, and as the equipped vehicle travels along a traffic lane of the road, determines a plurality of data points, and wherein each data point of the plurality of data points represents a respective position on a respective lane marker of the road relative to the equipped vehicle;

wherein the vehicular sensing system, as the equipped vehicle travels along the traffic lane of the road, tracks the respective positions on respective lane markers relative to the equipped vehicle to generate extrapolated lane markers rearward of the equipped vehicle;

wherein the vehicular sensing system, responsive to processing at the ECU of radar data captured by the radar sensor, detects presence of another vehicle rearward of the equipped vehicle;

wherein the vehicular sensing system, responsive to detecting presence of the other vehicle rearward of the equipped vehicle, determines location of the detected other vehicle relative to the generated extrapolated lane markers;

wherein the vehicular sensing system determines a collision threat for a lane change maneuver by the equipped vehicle based on the determined location of the detected other vehicle relative to the generated extrapolated lane markers; and wherein, responsive to determining that the detected other vehicle is not a collision threat for the lane change maneuver, the equipped vehicle is maneuvered into an adjacent traffic lane.

2. The vehicular sensing system of claim 1, wherein the vehicular sensing system stores the plurality of data points in a circular buffer.

3. The vehicular sensing system of claim 2, wherein, when the circular buffer is full, the vehicular sensing system overwrites the oldest data point of the plurality of data points.

4. The vehicular sensing system of claim 1, wherein the vehicular sensing system, for each respective data point of the plurality of data points, updates the respective position of the respective data point using a transformation based on a difference between the position of the equipped vehicle when the respective data point was determined and a current position of the equipped vehicle.

5. The vehicular sensing system of claim 4, wherein the updated respective position of each data point comprises (i) an updated lateral distance from the equipped vehicle, (ii) an updated longitudinal distance from the equipped vehicle and (iii) an updated orientation relative to the equipped vehicle.

6. The vehicular sensing system of claim 1, wherein the vehicular sensing system determines the collision threat for the lane change maneuver by the equipped vehicle based in part on speed of the detected other vehicle relative to the equipped vehicle.

7. The vehicular sensing system of claim 1, wherein the vehicular sensing system determines the collision threat for the lane change maneuver by the equipped vehicle based in part on distance of the detected other vehicle rearward of the equipped vehicle.

8. The vehicular sensing system of claim 1, wherein the vehicular sensing system determines individual data points of the plurality of data points that represent respective positions on the respective lane markers that are at least a threshold distance apart along the respective lane markers.

9. The vehicular sensing system of claim 8, wherein the threshold distance is based on speed of the equipped vehicle.

10. The vehicular sensing system of claim 1, wherein the vehicular sensing system determines a respective set of data points for each of (i) a left lane marker of the traffic lane, (ii) a right lane marker of the traffic lane, (iii) a right lane marker of a first adjacent traffic lane and (iv) a left lane marker of a second adjacent traffic lane.

11. The vehicular sensing system of claim 10, wherein the vehicular sensing system, after maneuvering the equipped vehicle to the adjacent traffic lane, (i) updates three of the respective sets of data points and (ii) resets one of the respective sets of data points.

12. The vehicular sensing system of claim 10, wherein the vehicular sensing system determines the collision threat for the lane change maneuver by the equipped vehicle based on the determined location of the detected other vehicle relative to the generated extrapolated lane markers being indicative of one selected from the group consisting of (i) the detected other vehicle being between the right lane marker of the traffic lane and the right lane marker of the first adjacent traffic lane and (ii) the detected other vehicle being between the left lane marker of the traffic lane and the left lane marker of the second adjacent traffic lane.

13. The vehicular sensing system of claim 10, wherein the vehicular sensing system determines that the detected other vehicle is traveling along the first adjacent traffic lane and determines a collision threat for a lane change maneuver by the equipped vehicle into the first adjacent traffic lane based on the determined location of the detected other vehicle relative to the generated extrapolated lane markers being indicative the detected other vehicle being between the right lane marker of the traffic lane and the right lane marker of the first adjacent traffic lane.

14. The vehicular sensing system of claim 10, wherein the vehicular sensing system determines that the detected other vehicle is traveling along the second adjacent traffic lane and determines a collision threat for a lane change maneuver by the equipped vehicle into the second adjacent traffic lane based on the determined location of the detected other vehicle relative to the generated extrapolated lane markers being indicative the detected other vehicle being between the left lane marker of the traffic lane and the left lane marker of the second adjacent traffic lane.

15. The vehicular sensing system of claim 10, wherein the vehicular sensing system determines that the detected other vehicle is not a collision threat for the lane change maneuver by the equipped vehicle based on the determined location of the detected other vehicle relative to the generated extrapolated lane markers being indicative of one selected from the group consisting of (i) the detected other vehicle being between the left lane marker of the traffic lane and the right lane marker of the traffic lane, (ii) the detected other vehicle being further to the right laterally than the right lane marker of the first adjacent traffic lane and (iii) the detected other vehicle being further to the left laterally than the left lane marker of the second adjacent traffic lane.

16. The vehicular sensing system of claim 1, wherein the vehicular sensing system determines which traffic lane the detected other vehicle is located within based on a comparison between location of the detected other vehicle relative to the equipped vehicle and the generated extrapolated lane markers.

17. The vehicular sensing system of claim 1, wherein the vehicular sensing system determines the collision threat for the lane change maneuver based on a minimum safe distance between the equipped vehicle and the detected other vehicle.

18. The vehicular sensing system of claim 17, wherein the minimum safe distance comprises at least one selected from the group consisting of (i) a braking delay distance, (ii) a deceleration distance and (iii) a distance traveled by the equipped vehicle in a threshold period of time based on a current speed of the equipped vehicle.

19. The vehicular sensing system of claim 1, wherein the vehicular sensing system, responsive to determining the collision threat for the lane change maneuver, prohibits the lane change maneuver.

20. The vehicular sensing system of claim 19, wherein the vehicular sensing system, responsive to determining the collision threat for the lane change maneuver, cancels a steering command.

21. The vehicular sensing system of claim 1, wherein the vehicular sensing system, responsive to determining the collision threat for the lane change maneuver, generates at least one selected from the group consisting of (i) an audible warning for the driver of the equipped vehicle, (ii) a visual warning for the driver of the equipped vehicle and (iii) a haptic warning for the driver of the equipped vehicle.

22. A vehicular sensing system, the vehicular sensing system comprising:

a camera disposed at a vehicle equipped with the vehicular sensing system, the camera viewing exterior and at least forward of the equipped vehicle;

wherein the camera is operable to capture image data;

wherein the camera comprises a CMOS imaging array, and wherein the CMOS imaging array comprises at least one million photosensors arranged in rows and columns;

a radar sensor disposed at the equipped vehicle, the radar sensor sensing exterior and at least rearward of the equipped vehicle;

wherein the radar sensor is operable to capture radar data;

an electronic control unit (ECU) comprising electronic circuitry and associated software;

wherein image data captured by the camera is transferred to the ECU, and wherein radar data captured by the radar sensor is transferred to the ECU;

wherein the electronic circuitry of the ECU comprises at least one data processor that is operable to (i) process image data captured by the camera and transferred to the ECU and (ii) process radar data captured by the radar sensor and transferred to the ECU;

wherein a road along which the vehicle is traveling comprises at least two traffic lanes, each demarcated with respective lane markers;

wherein the vehicular sensing system, responsive to processing at the ECU of image data captured by the camera, and as the equipped vehicle travels along a traffic lane of the road, determines a respective set of data points for each of (i) a left lane marker of the traffic lane, (ii) a right lane marker of the traffic lane, (iii) a right lane marker of a first adjacent traffic lane and (iv) a left lane marker of a second adjacent traffic lane, and wherein each data point of each respective set of data points represents a respective position on a respective lane marker of the road relative to the equipped vehicle;

wherein the vehicular sensing system, as the equipped vehicle travels along the traffic lane of the road, tracks the respective positions on respective lane markers relative to the equipped vehicle;

wherein the vehicular sensing system, responsive to processing at the ECU of radar data captured by the radar sensor, detects presence of another vehicle rearward of the equipped vehicle;

wherein the vehicular sensing system, for each respective data point of each respective set of data points, updates the respective position of the respective data point using a transformation based on a difference between the position of the equipped vehicle when the respective data point was determined and a current position of the equipped vehicle to generate extrapolated lane markers rearward of the equipped vehicle;

wherein the vehicular sensing system, responsive to detecting presence of the other vehicle rearward of the equipped vehicle, determines location of the detected other vehicle relative to the generated extrapolated lane markers;

wherein the vehicular sensing system determines a collision threat for a lane change maneuver by the equipped vehicle based on the determined location of the detected other vehicle relative to the generated extrapolated lane markers; and wherein, responsive to determining that the detected other vehicle is not a collision threat for the lane change maneuver, the equipped vehicle is maneuvered into an adjacent traffic lane.

23. The vehicular sensing system of claim 22, wherein the updated respective position of each data point comprises (i) an updated lateral distance from the equipped vehicle, (ii) an updated longitudinal distance from the equipped vehicle and (iii) an updated orientation relative to the equipped vehicle.

24. The vehicular sensing system of claim 22, wherein the vehicular sensing system, after maneuvering the equipped vehicle to the adjacent traffic lane, (i) further updates three of the sets of data points based on the lane change maneuver and (ii) resets one of the sets of data points.

25. The vehicular sensing system of claim 22, wherein the vehicular sensing system determines which traffic lane the detected other vehicle is located within based on a comparison between location of the detected other vehicle relative to the equipped vehicle and the generated extrapolated lane markers.

26. The vehicular sensing system of claim 22, wherein the vehicular sensing system determines that the detected other vehicle is traveling along the first adjacent traffic lane and determines a collision threat for a lane change maneuver by the equipped vehicle into the first adjacent traffic lane based on the determined location of the detected other vehicle relative to the generated extrapolated lane markers being indicative the detected other vehicle being between the right lane marker of the traffic lane and the right lane marker of the first adjacent traffic lane.

27. The vehicular sensing system of claim 22, wherein the vehicular sensing system determines that the detected other vehicle is traveling along the second adjacent traffic lane and determines a collision threat for a lane change maneuver by the equipped vehicle into the second adjacent traffic lane based on the determined location of the detected other vehicle relative to the generated extrapolated lane markers being indicative the detected other vehicle being between the left lane marker of the traffic lane and the left lane marker of the second adjacent traffic lane.

28. The vehicular sensing system of claim 22, wherein the vehicular sensing system determines that the detected other vehicle is not a collision threat for the lane change maneuver by the equipped vehicle based on the determined location of the detected other vehicle relative to the generated extrapolated lane markers being indicative of one selected from the group consisting of (i) the detected other vehicle being between the left lane marker of the traffic lane and the right lane marker of the traffic lane, (ii) the detected other vehicle being further to the right laterally than the right lane marker of the first adjacent traffic lane and (iii) the detected other vehicle being further to the left laterally than the left lane marker of the second adjacent traffic lane.

29. A vehicular sensing system, the vehicular sensing system comprising:

a camera disposed at a vehicle equipped with the vehicular sensing system, the camera viewing exterior and at least forward of the equipped vehicle;

wherein the camera is operable to capture image data;

wherein the camera comprises a CMOS imaging array, and wherein the CMOS imaging array comprises at least one million photosensors arranged in rows and columns;

a radar sensor disposed at the equipped vehicle, the radar sensor sensing exterior and at least rearward of the equipped vehicle;

wherein the radar sensor is operable to capture radar data;

an electronic control unit (ECU) comprising electronic circuitry and associated software;

wherein image data captured by the camera is transferred to the ECU, and wherein radar data captured by the radar sensor is transferred to the ECU;

wherein the electronic circuitry of the ECU comprises at least one data processor that is operable to (i) process image data captured by the camera and transferred to the ECU and (ii) process radar data captured by the radar sensor and transferred to the ECU;

wherein a road along which the vehicle is traveling comprises at least two traffic lanes, each demarcated with respective lane markers;

wherein the vehicular sensing system, responsive to processing at the ECU of image data captured by the camera, and as the equipped vehicle travels along a traffic lane of the road, determines a plurality of data points, and wherein each data point of the plurality of data points represents a respective position on a respective lane marker of the road relative to the equipped vehicle;

wherein the vehicular sensing system, as the equipped vehicle travels along the traffic lane of the road, tracks the respective positions on respective lane markers relative to the equipped vehicle to generate extrapolated lane markers rearward of the equipped vehicle;

wherein the vehicular sensing system, responsive to processing at the ECU of radar data captured by the radar sensor, detects presence of another vehicle rearward of the equipped vehicle;

wherein the vehicular sensing system, responsive to detecting presence of the other vehicle rearward of the equipped vehicle, determines location of the detected other vehicle relative to the generated extrapolated lane markers;

wherein the vehicular sensing system determines a collision threat for a lane change maneuver by the equipped vehicle based on the determined location of the detected other vehicle relative to the generated extrapolated lane markers; and wherein the vehicular sensing system, responsive to determining that the detected other vehicle is a collision threat for the lane change maneuver, (i) prohibits the lane change maneuver and (ii) generates at least one selected from the group consisting of (a) an audible warning for the driver of the equipped vehicle, (b) a visual warning for the driver of the equipped vehicle and (c) a haptic warning for the driver of the equipped vehicle.

30. The vehicular sensing system of claim 29, wherein the vehicular sensing system, responsive to determining the collision threat for the lane change maneuver, cancels a steering command.

31. The vehicular sensing system of claim 29, wherein the vehicular sensing system determines the collision threat for the lane change maneuver based on a minimum safe distance between the equipped vehicle and the detected other vehicle.

32. The vehicular sensing system of claim 29, wherein the minimum safe distance comprises at least one selected from the group consisting of (i) a braking delay distance, (ii) a deceleration distance and (iii) a distance traveled by the equipped vehicle in a threshold period of time based on a current speed of the equipped vehicle.

* * * * *